(12) United States Patent
Li et al.

(10) Patent No.: US 11,003,056 B2
(45) Date of Patent: May 11, 2021

(54) CAMERA

(71) Applicant: TRIPLE WIN TECHNOLOGY(SHENZHEN) CO.LTD., Shenzhen (CN)

(72) Inventors: Kun Li, Shenzhen (CN); Shin-Wen Chen, New Taipei (TW); Long-Fei Zhang, Guangdong (CN); Xiao-Mei Ma, Guangdong (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 197 days.

(21) Appl. No.: 16/182,561

(22) Filed: Nov. 6, 2018

(65) Prior Publication Data

US 2020/0073211 A1     Mar. 5, 2020

(30) Foreign Application Priority Data

Aug. 29, 2018  (CN) .......................... 201810996925.4

(51) Int. Cl.
*G03B 17/55* (2021.01)
*G02B 7/04* (2021.01)
(Continued)

(52) U.S. Cl.
CPC .............. *G03B 17/55* (2013.01); *G02B 1/14* (2015.01); *G02B 7/006* (2013.01); *G02B 7/008* (2013.01);
(Continued)

(58) Field of Classification Search
CPC ........ G03B 17/55; G03B 11/00; G03B 13/34; G02B 7/04; G02B 7/006; G02B 7/025;
(Continued)

(56) References Cited

U.S. PATENT DOCUMENTS 2,353,898 A * 7/1944 Nitsch .................... G03B 17/55
396/12
2004/0260470 A1* 12/2004 Rast ...................... G06Q 10/083
701/300

(Continued)

FOREIGN PATENT DOCUMENTS

| CN | 106646806 A | 5/2017 |
| CN | 207560173 U | 6/2018 |
| CN | 108333854 A | 7/2018 |

*Primary Examiner* — Jade R Chwasz
(74) *Attorney, Agent, or Firm* — ScienBiziP, P.C.

(57) ABSTRACT

A camera includes a bracket, a lens base, a lens, a filter, a circuit board, and a photosensitive, chip. The bracket defines a first receiving space, a second receiving space, and a through hole. The through hole is in communication with the first receiving space and the second receiving space. The lens is mounted on the lens base. The filter is received within the first receiving space. The circuit board is mounted on the side of the bracket defining the second receiving space. The photosensitive chip mounted on the circuit board faces the through hole. The bracket includes a heating member and two conductive circuits. The filter is mounted on the heating member such that a periphery of the filter is in contact with the heating member. Each of the two conductive circuit layers is electrically coupled between the heating member and the circuit board to heat the filter.

9 Claims, 5 Drawing Sheets

(51) Int. Cl.
  *G03B 11/00* (2021.01)
  *G02B 7/00* (2021.01)
  *G02B 7/02* (2021.01)
  *G02B 1/14* (2015.01)
  *G03B 13/34* (2021.01)
  *G02B 27/00* (2006.01)
  *H04N 5/225* (2006.01)

(52) U.S. Cl.
  CPC ............... *G02B 7/025* (2013.01); *G02B 7/04* (2013.01); *G02B 27/0006* (2013.01); *G03B 11/00* (2013.01); *G03B 13/34* (2013.01); *H04N 5/2253* (2013.01); *H04N 5/2254* (2013.01)

(58) Field of Classification Search
  CPC ...... G02B 1/14; G02B 27/0006; G02B 7/008; G02B 7/08; H04N 5/2254; H04N 5/2253; H04N 5/22521
  See application file for complete search history.

(56) References Cited

U.S. PATENT DOCUMENTS

2014/0055669 A1* 2/2014 Chen .................... H04N 5/2254
  348/374
2018/0013941 A1* 1/2018 Freeman ............ H04N 5/23245

* cited by examiner

CAMERA

FIELD

The subject matter herein generally relates to cameras.

BACKGROUND

Cameras are often mounted in electronic devices, such as mobile phones and tablet computers. Components of the camera are generally sealed within the electronic device. In humid environments, the components of the camera, such as a filter, may accumulate moisture or fog, which influences performance of the camera.

BRIEF DESCRIPTION OF THE DRAWINGS

Implementations of the present disclosure will now be described, by way of example only, with reference to the attached figures.

DETAILED DESCRIPTION

Figure 1:
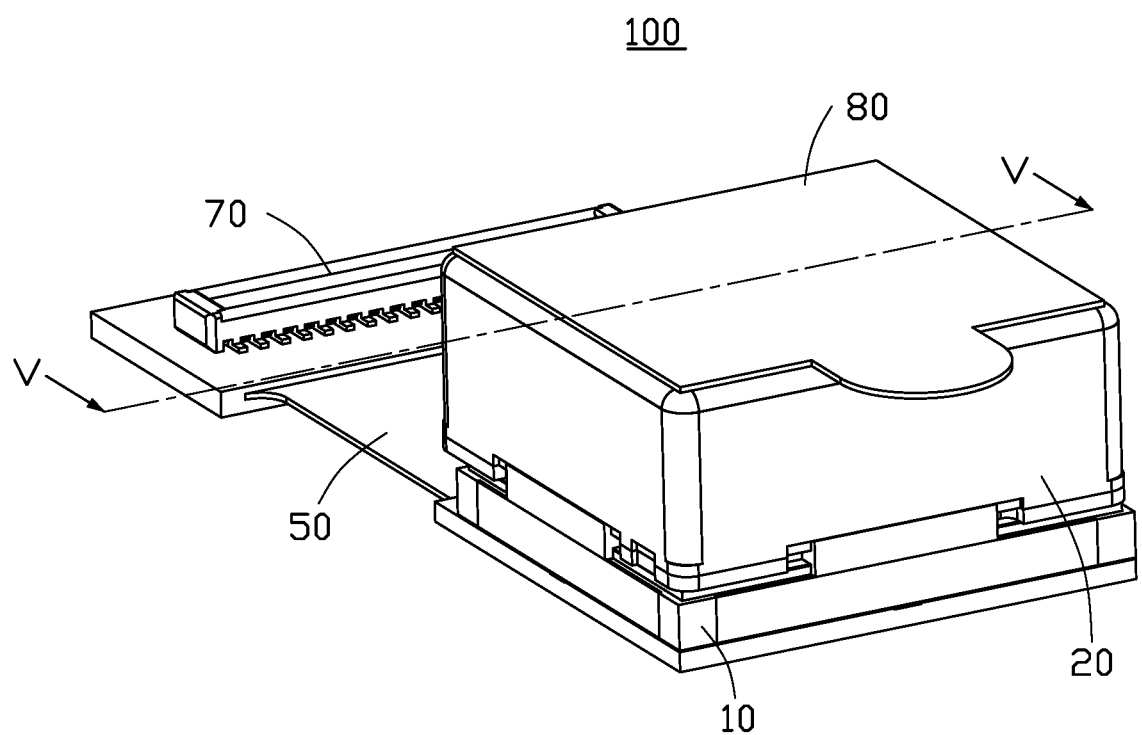
FIG. 1 is an assembled, isometric view of an embodiment of a camera.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
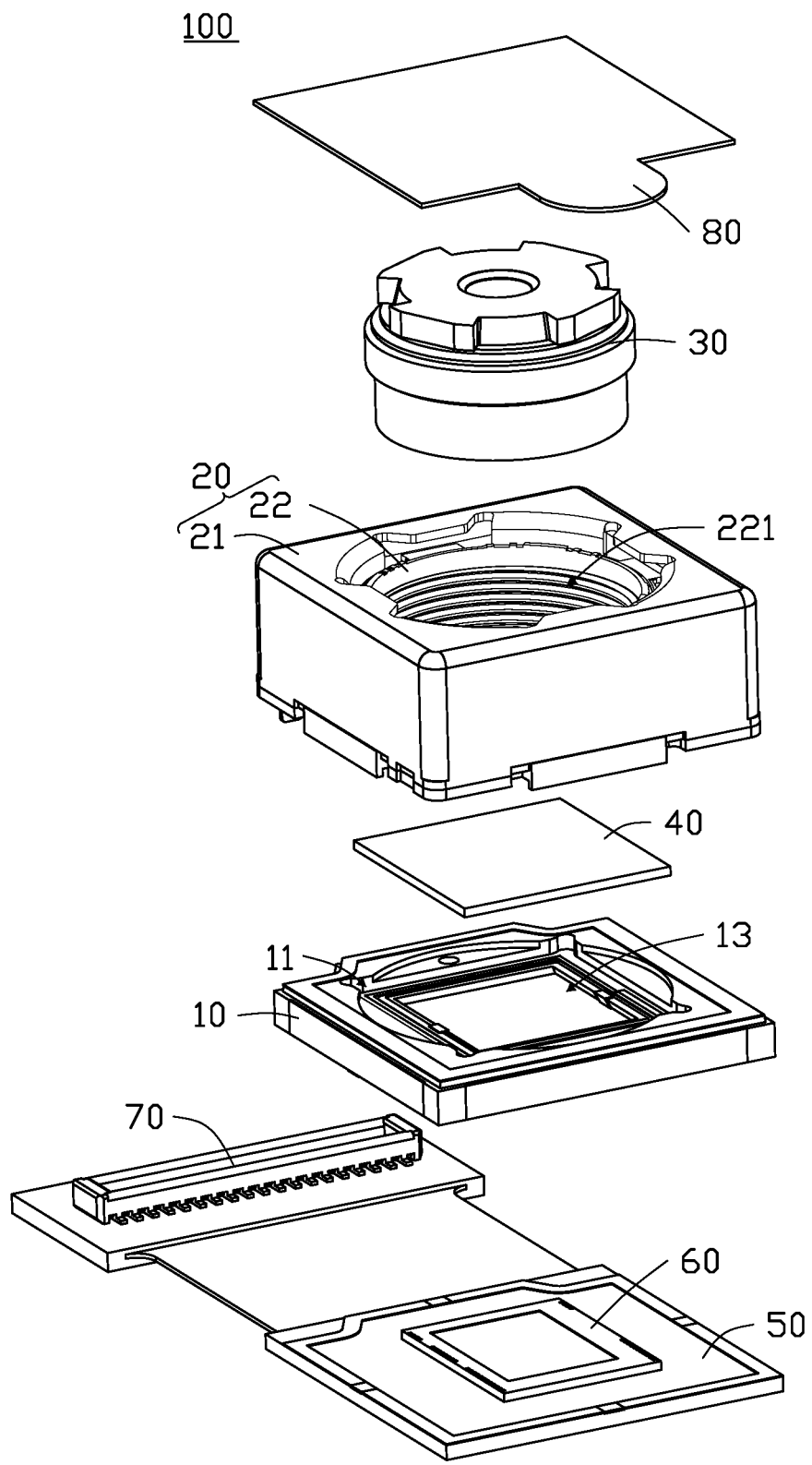
FIG. 2 is an exploded, isometric view of the camera in FIG. 1.

FIG. 1 and FIG. 2 show an embodiment of a camera 100. The camera 100 includes a bracket 10, a lens base 20, a lens 30, a filter 40, a circuit board 50, a photosensitive chip 60, and a connector 70. The lens base 20, the filter 40, the circuit board 50, and the photosensitive chip 60 are mounted on the bracket 10. The lens 30 is mounted on the lens base 20. The connector 70 is electrically coupled to the circuit board 50.

Figure 3:
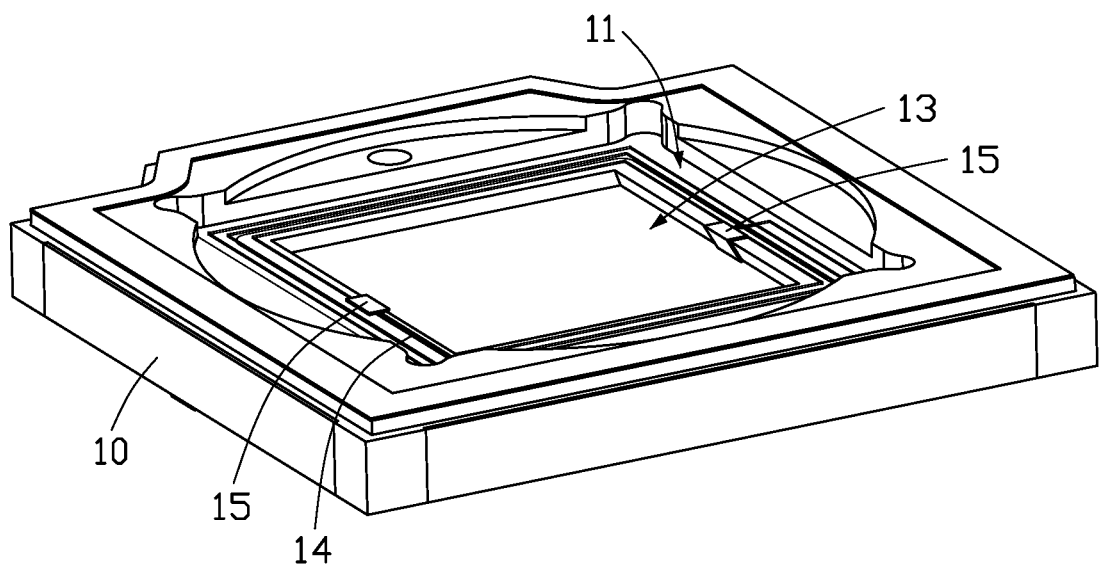
FIG. 3 is an isometric view of a bracket of the camera.
Figure 4:
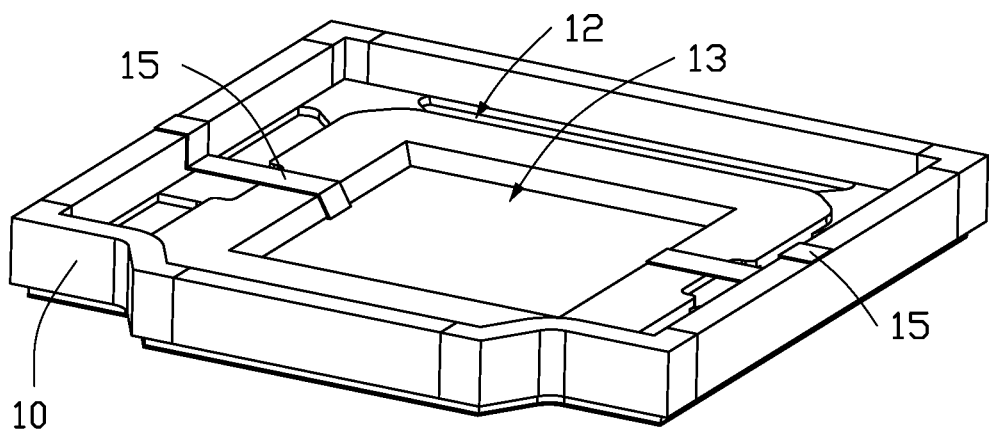
FIG. 4 is similar to FIG. 3, but shows the bracket from another angle.

FIG. 3 and FIG. 4 show the bracket 10 is substantially rectangular. The bracket 10 defines a first receiving space 11, a second receiving space 12, and a through hole 13. The first receiving space 11 and the second receiving space 12 are defined in opposite sides of the bracket 10. The through hole 13 is in communication with the first receiving space 11 and the second receiving space 12. In one embodiment, the through hole 13 is substantially rectangular, but is not limited to be rectangular. In other embodiments, the through hole 13 may be other shapes according to requirements.

FIG. 3 shows the bracket 10 includes a heating member 14 and two conductive circuits 15. The heating member 14 is partially mounted within a bottom surface (not labeled) of the first receiving space 11 and surrounds the through hole 13. Each conductive circuit 15 is substantially rectangular. Each conductive circuit 15 is electrically coupled to the heating member 14. One end of each conductive circuit 15 is electrically coupled to the circuit board 50 to electrically coupled to the heating member 14.

In one embodiment, the heating member 14 is a coil formed by bending a resistance wire, but is not limited thereto. In other embodiments, the heating member 14 may be other shapes as long as the heating member 14 is able to adequately heat the filter 40.

In one embodiment, each conductive circuit 15 is located on a bottom surface (not labeled) of the first receiving space 11 and on a bottom surface (not labeled) of the second receiving space 12 and extends along an inner wall (not labeled) of the through hole 13 between the first receiving space 11 and the second receiving space 12. Each conductive circuit 15 is electrically coupled to the heating member 14. Each conductive circuit 15 may be formed on the bracket 10 by laser direct structuring, but is not limited thereto. In other embodiments, the conductive circuits 15 may be formed from metal films adhered onto the bracket 10 and etched.

Figure 5:
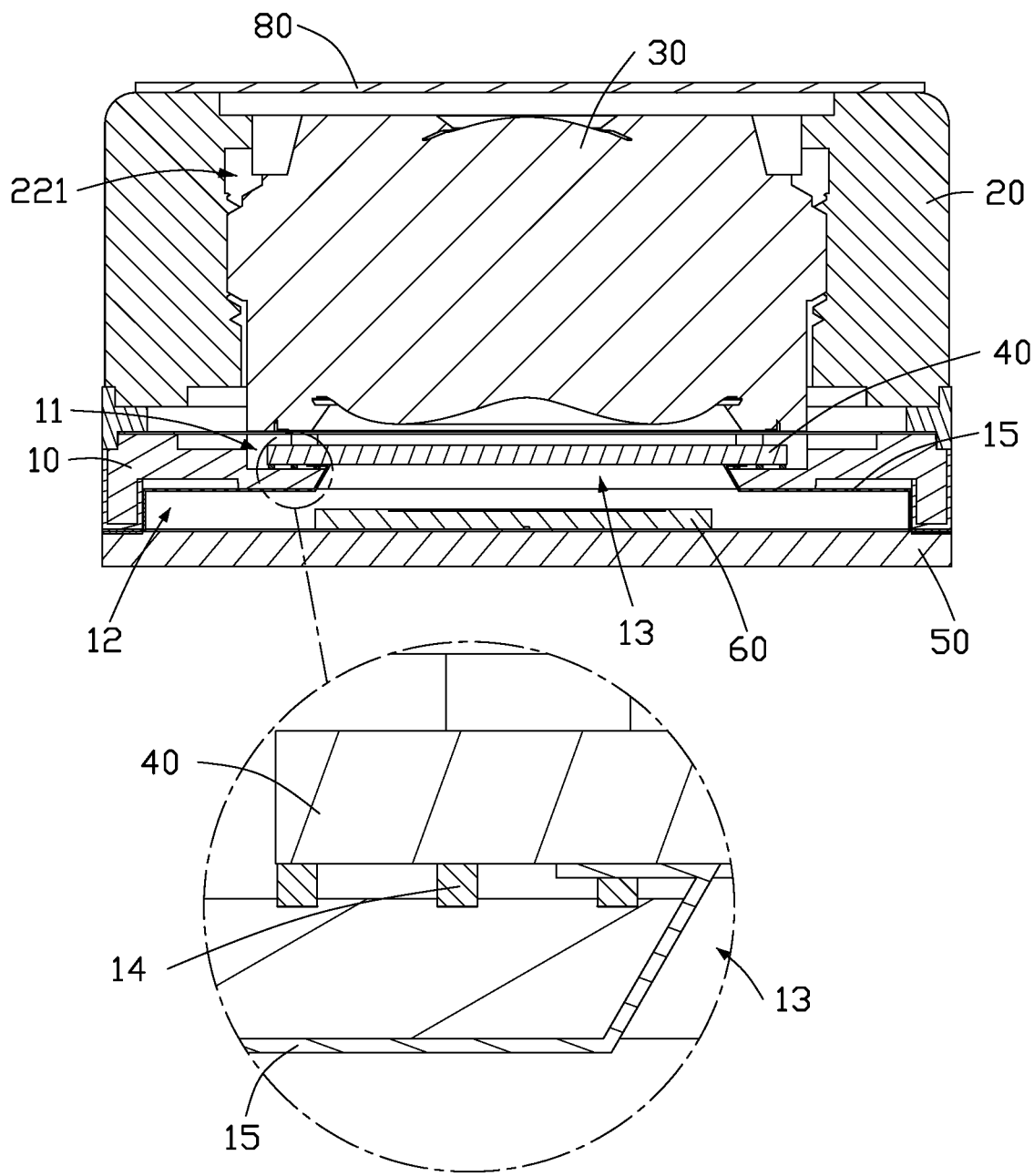
FIG. 5 is a cross-sectional view taken along line V-V in FIG. 1.

FIG. 2 and FIG. 5 show the lens base 20 is mounted on the side of the bracket 10 defining the first receiving space 11. The lens base 20 includes a base body 21 and a voice coil motor 22. The base body 21 is substantially rectangular. The voice coil motor 22 is mounted within the base body 21. The voice coil motor 22 defines a mounting hole 221 in a substantially central portion of the voice coil motor 22.

The lens 30 is partially mounted within the mounting hole 221. The lens 30 is driven to move by the voice coil motor 22 to focus the lens 30.

The filter 40 is received within the first receiving space 11 and covers the through hole 13. The filter 40 is mounted on the heating member 14 such that a periphery of the filter 40 is in contact with the heating member 14. The filter 40 is heated by the heating member 14 to dispel moisture or fog from the filter 40. In one embodiment, the filter 40 is substantially rectangular, but is not limited to be rectangular. In other embodiments, the filter 40 may be other shapes according to requirements.

FIGS. 2-5 show the circuit board 50 is mounted on the side of the bracket 10 defining the second receiving space 12. The photosensitive chip 60 is mounted on and electrically coupled to the circuit board 50. The photosensitive chip 60 is receiving within the second receiving space 12 facing the through hole 13. The connector 70 is mounted on and electrically coupled to the circuit board 50. The connector 70 electrically couples to an external component to provide power and information transmission to the camera 100. In one embodiment, the circuit board 50 is a flexible circuit board.

The camera 100 further includes a protecting member 80. The protecting member 80 is substantially rectangular and covers over the lens 30 to protect the lens 30. In one embodiment, the protecting member 80 is made of transparent material.

FIGS. 1-4 show in assembly, the filter 40 is received within the first receiving space 11 and mounted on the heating member 14. The lens base 20 is mounted on the side of the bracket 10 defining the first receiving space 11, and the lens 30 is partially mounted within the mounting hole 221 of the voice coil motor 22. The photosensitive chip 60 is mounted on the circuit board 50, and the circuit board 50 is mounted on the side of the bracket 10 defining the second receiving space 12. The connector 70 is mounted on and electrically coupled to the circuit board 50. Finally, the protecting member 80 is covered over the lens 30, thereby completing assembly of the camera 100.

In other embodiments, the connector 70 may be omitted, such that the circuit board 50 is electrically coupled directly to the external component.

In other embodiments, each conductive circuit 15 is formed and located within the bracket 10 and electrically coupled between the heating member 14 and the circuit board 50.

The camera 100 as described above uses the heating member 14 to heat the filter 40 to dispel moisture and fog from the filter 40, thereby improving performance of the camera 100.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A camera comprising:
   a bracket defining a first receiving space, a second receiving space, and a through hole, the first receiving space and the second receiving space defined in opposite sides of the bracket, the through hole in communication with the first receiving space and the second receiving space;
   a lens base mounted on one of the opposite sides of the bracket defining the first receiving space;
   a lens mounted on the lens base;
   a filter received within the first receiving space and covering the through hole;
   a circuit board mounted on the side of the bracket defining the second receiving space;
   a photosensitive chip mounted on the circuit board and received within the second receiving space facing the through hole;
   wherein the bracket comprises a heating member and two conductive circuits;
   the heating member is partially embedded in a bottom surface of the first receiving space, and the heating member surrounds the through hole;
   a periphery of the filter is mounted on the bottom surface of the first receiving space such that the periphery of the filter is in contact with the heating member;
   each of the two conductive circuit layers is electrically coupled between the heating member and the circuit board;
   the two conductive circuits are configured to heat the filter;
   the lens base comprises a base body and a voice coil motor;
   the voice coil motor is mounted within the base body;
   the voice coil motor defines a mounting hole; and
   the lens is partially mounted within the mounting hole and driven to move by the voice coil motor.

2. The camera of claim 1, wherein the heating member is a rectangular coil formed by bending a resistance wire.

3. The camera of claim 1, wherein each conductive circuit is directly formed on the bracket by laser direct structuring; each conductive circuit is located on a bottom surface of the first receiving space and a bottom surface of the second receiving space and extends along an inner wall of the through hole between the first receiving space and the second receiving space; each conductive circuit is electrically coupled to the heating member.

4. The camera of claim 1, wherein each conductive circuit is formed and located within the bracket.

5. The camera of claim 1, further comprising a protecting member covered over the lens.

6. The camera of claim 5, wherein the protecting member is rectangular.

7. The camera of claim 1, further comprising a connector mounted on and electrically coupled to the circuit board; the connector electrically couples to an external component to provide power and information transmission to the camera.

8. The camera of claim 1, wherein the through hole is rectangular.

9. The camera of claim 1, wherein the filter is rectangular.

* * * * *